G. W. N. Yost.
Mower.
No. 82,782.                Patented. Oct. 6. 1868.
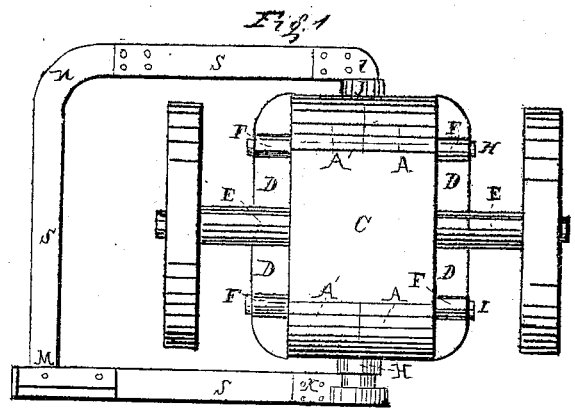
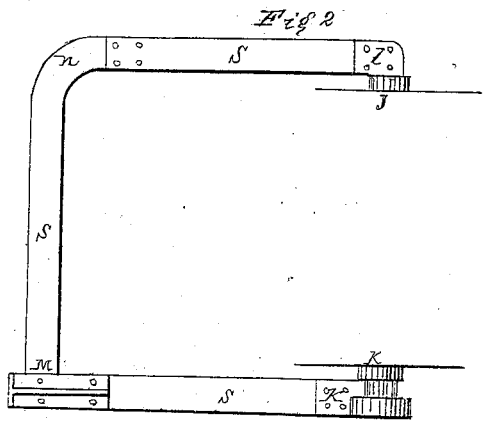
Witnesses.            Inventor.
James Densmore,     G. W. N. Yost,
William Wansleben.    by atty,
                         Jo. C. Clayton

UNITED STATES PATENT OFFICE.

GEORGE W. N. YOST, OF CORRY, PENNSYLVANIA, ASSIGNOR TO CORRY MACHINE COMPANY, OF SAME PLACE.

IMPROVEMENT IN HARVESTERS.

Specification forming part of Letters Patent No. 82,782, dated October 6, 1868.

*To all whom it may concern:*

Be it known that I, GEORGE W. N. YOST, of Corry, Erie county, Pennsylvania, have invented a new and useful Climax Floating Bar—an improvement of my climax-body—for grass and grain cutting machines.

The accompanying drawing, illustrating it, with the description herein, the specifying letters of drawing, and description referring to one another will enable others to make and use the invention.

A and A', C, D, E, F, H, and I are my climax-body, and R is an end of my climax-yoke sleeve, projecting out through the middle of the fore end of the body. Out from the middle of the hind end of the body projects the hub $j$, half in each, and cast with or made a solid part of the cases A and A', four inches in diameter and three inches long, more or less. Through the middle of the hub $j$ make a square hole, two inches in diameter, more or less. Make a bar, S, of spring-steel or any suitable elastic material, four inches wide, one-fourth inch thick, and nine feet long, all more or less. Make the bar S all in one piece, or in several pieces, riveted or fastened together, as preferred, and make it practically to surround three sides of a square. Attach the bar S rigidly to the body A and A' by fastening the end $k$ to a collar, to slip over and fasten to the end of the sleeve R by a set-screw, and by fastening the end $l$ to an arm, to go in and fill the hole in the hub $j$, or attach the two ends $k$ and $l$ of the bar S to the middle of the two ends of the body A and A' rigidly, in any obvious and desired way. Make the bar S square at the corner $m$, but of any desired form at the point $n$, so as to surround the traveling wheel next to the cutting machinery. To the corner $m$ of the bar S attach, in any desired way, the finger-bar and other cutting machinery of an ordinary two-wheeled grass and grain cutting machine.

The bar S, by having its two ends $k$ and $l$ attached to the middle points of the two ends of the body A and A' by firm and rigid means, practically is made a solid part of the body itself, with the weight equally distributed upon the body, and by being elastic makes a floating bar for the cutting machinery at once simple, neat, cheap, and durable.

The invention consists in attaching the cutting machinery to the middle, equally, of the fore end and hind end of the main frame or body A and A' by means of the elastic bar S, rigidly attached to the body, and also attached to the cutting machinery.

I know that elastic bars have been used heretofore for floats for the cutting machinery of grass and grain cutting machines; but my special arrangement and application I think new and useful, and 1 limit myself thereto. Therefore,

What I claim, and desire patented, is—

The elastic floating bar S, rigidly attached to the main frame or body A and A', with the end $l$ fastened to the middle of the hind end of the body, and with end $k$ fastened to the middle of the fore end of the body, as described, for grass and grain cutting machines.

In testimony that I claim the above-described new and useful climax floating bar for grass and grain cutting machines, I have hereunto signed my name this 26th day of June, 1868.

G. W. N. YOST.

Witnesses:
JAMES DENSMORE,
C. W. ARCHBOLD.